Figure 1:
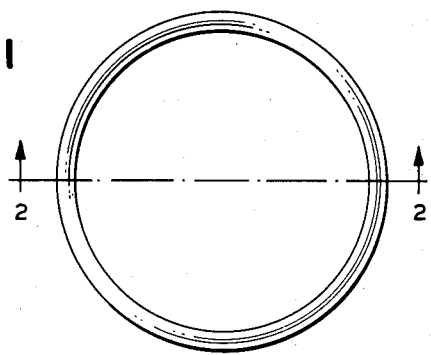

Sept. 6, 1955   U. JELINEK   2,717,025
GASKET AND METHOD FOR FORMING SAME
Filed Dec. 19, 1952

INVENTOR.
ULRICH JELINEK
BY
ATTORNEYS

# United States Patent Office 2,717,025
Patented Sept. 6, 1955

2,717,025

GASKET AND METHOD FOR FORMING SAME

Ulrich Jelinek, Springfield, N. J., assignor to The M. W. Kellogg Company, Jersey City, N. J., a corporation of Delaware Application December 19, 1952, Serial No. 326,911

19 Claims. (Cl. 154—33.1)

This invention relates to insulating compositions and the method of preparing them. In one aspect, the invention relates to insulating compositions in the form of gaskets covered with a polymer of tetrafluoroethylene. More particularly in this aspect, the invention relates to resilient solid insulating compositions in the form of gaskets covered with a solid polymer of tetrafluoroethylene.

The manufacture of insulating compositions, in the form of gaskets, possessing elasticity or shape-retaining properties is not new. Gaskets having such properties are particularly useful in turbines, motors, generators, or other forms of machines requiring gaskets or nose-seals which can effectively function at high speeds and under high pressures, while undergoing distortion and even some abrasion under such conditions. Various materials possessing such elastic or resilient properties have been heretofore employed in the manufacture of shape-retaining gaskets or seals. Such materials include rubber (both natural and synthetic), various thermoplastic compositions, and various reinforced and impregnated plastics.

It has been found, however, that in many industrial applications, gaskets made of such materials are not chemically resistant when exposed to various powerful oxidizing agents, in the course of performing their mechanical functions, such as fuming nitric acid, sulfuric acid, hydrofluoric acid, motor fuels used as rocket propellants, and various reagents such as aqua regia, hydrochloric acid, other strong acids and strong caustic solutions. Exposure of gaskets, manufactured from such materials, results in their rapid deterioration, impaired efficiency and relatively short useful life. It is, therefore, desirable to provide an improved gasket composed of materials which not only possess the aforementioned structural elasticity and shape-retaining properties, but which also are chemically resistant to attack or deterioration by any of the aforementioned oxidizing agents, motor fuels or reagents.

It is an object of this invention to provide an improved insulating composition in the form of a gasket.

Another object of this invention is to provide an improved insulating composition in the form of a gasket having structural elasticity and shape-retaining properties, but also resistant to chemical attack or deterioration.

Still another object of the invention is to provide a method for preparing an improved insulating composition in the form of a gasket.

Various other objects and advantages of the present invention will become apparent to those skilled in the art from the accompanying description and disclosure.

In accordance with this invention, I have discovered that insulating compositions in the form of gaskets, comprising a resilient solid material as a core and covered with a relatively thin contiguous sheath comprising a polymer of tetrafluoroethylene, are more chemically and abrasion resistant while, at the same time, possessing a substantially similar overall modulus of elasticity as gaskets comprised of the same resilient solid material, but without the additional covering of the aforementioned polymer of tetrafluoroethylene. These gaskets covered with a sheath of polymeric tetrafluoroethylene, in addition to possessing the aforementioned chemical and abrasion-resistant advantages, exhibit substantially no indications of diminished desirable physical properties and are just as resilient as gaskets comprised of similar core materials, not covered with a sheath comprising a polymer of tetrafluoroethylene.

In forming the improved insulating composition or gasket of the present invention, in accordance with a preferred modification of the invention, the core of the gasket (comprising a selected non-metallic resilient solid material, as more fully hereinafter described), is preformed. Likewise, the tetrafluoroethylene plastic sheath is also separately preformed, in the form of two one-half O rings or complementary torus-like shells for subsequently encasing the preformed core material. The term "one-half an O ring" is intended to denote a circular ring of tetrafluoroethylene plastic, split through the center plane to form one-half of the encasing shell. In another aspect, these two shells may comprise a pair of complementary torus-like shells, of more or less than half an O ring, and which may also be in the form of a noncircular section of an elliptical sheath.

The two sections of the sheath of the improved gasket are preformed, as more fully hereinafter described, by compressing powdered or granular tetrafluoroethylene within a die cavity, of desired contour, preferably at ambient temperature (although any temperature below the sintering temperature, hereinafter described, may also be employed), but under a pressure sufficiently high to permit the particles of the solid polymer to cohere, so that the sections comprising the sheath of the desired gasket, may be handled without breaking apart. The aforementioned preformed core material is next superimposed upon the surface of one of the preformed cold shell members, and the remaining complementary shell member is then superimposed upon the aforementioned shell member containing the core material. The core material, encased within the two shell members, is subjected to a sintering operation in a die cavity having the shape of the desired gasket. After the sintering operation has been completed, the finished gasket is cooled and removed from the die.

It has been found that gaskets, in the form of O rings or torus-like rings, prepared in accordance with the general process of the invention, described above, are obtained completely free of seams that would normally otherwise occur in heat-sealing molded polymer shells of other plastic materials, to themselves, as has heretofore been the practice. Furthermore, the flow of the individual tetrafluoroethylene polymer particles into a fused singular O ring or torus-like ring, has been found to result in a more homogeneous product, having superior structural strength, and which will not come apart either at high or low temperatures. The improved gasket of the present invention, can function satisfactorily, in this respect, over a temperature range from approximately —90° F. to a temperature as high as 500° F., or even higher, depending upon the temperature of decomposition of the core material.

As previously indicated, the polytetrafluoroethylene sheath, in accordance with a preferred modification of the invention, is separately preformed in the form of two one-half O rings or complementary torus-like shells for subsequently encasing the preformed core material. Each of these one-half O rings or torus-like shells, as indicated above, is preformed by compressing powdered or granular tetrafluoroethylene within a die cavity at ambient temperature (although any temperature below the sintering temperature, hereinafter described, may also be employed) but under pressure, which is sufficiently high to permit the particles of the polymer to cohere. For this purpose, a previously weighed-out quantity of powdered or granular polytetrafluoroethylene (depending upon the desired thickness of the one-half O ring or torus-like shell) is placed within a circular or elliptical or otherwise-shaped die cavity, and subjected to pressures between about 500 and about 25,000 pounds per square inch, with pressures between about 2,000 and about 15,000 pounds per square inch being preferred. Coherence between the tetrafluoroethylene particles takes place almost immediately upon application of the required pressure. The resulting section, comprising one of the members of the sheath of the desired gasket, may now be removed from the die and handled without breaking apart.

Considering now, the preforming of the core of the improved insulating composition or gasket of the present invention, this core, as previously described, comprises a non-metallic resilient solid material having structural elasticity and shape-retaining properties. Various materials may, therefore, be employed in preforming the core of the improved gasket. The core, therefore, may comprise such materials as asbestos; powdered minerals, e. g., talc, mica, soapstone, traprock or oyster shell; various clays, e. g., diatomaceous earths; graphite; fiber glass; and various thermoplastics, e. g., silicone resins; or various combinations of the foregoing. It should be noted that any non-metallic solid resilient material may be employed as a core, which will not decompose at temperatures between the softening temperature of tetrafluoroethylene and the temperature of decomposition of tetrafluoroethylene (e. g., between about 700° F. and about 800° F.), in the sintering operation of the tetrafluoroethylene sheath, hereinafter described.

In connection with the aforementioned fabrication of the core of the improved gasket of the present invention, materials may be employed, in some instances, which do not in themselves possess the required structural elasticity or shape-retaining properties; or even if such materials, in some instances, actually possess the aforementioned desired properties, it may be difficult to obtain the core in such condition as to permit its handling for the purpose of encasing it in a sheath of tetrafluoroethylene. When such is the case, it is often desirable to fabricate such core materials, either by suitable heating operations or by molding operations, in conjunction with a binder. Binders selected for this purpose, should be those whose molding temperature is below the decomposition temperature of the selected core material itself or filler, but whose decomposition temperature is higher than that of the selected core material. Examples of suitable binding materials are silicates, silicone resins, and polymeric tetrafluoroethylene itself. The core material (or filler) together with the binding material are referred to as the composite. This composite may comprise filler in an amount between about 50% and about 95% by weight, and binder in an amount between about 5% and about 50% by weight. Expressed in another manner, the weight ratio of filler to binder may vary between about 1:1 and about 19:1. A preferred composite comprises a silicone resin, asbestos or any of the aforementioned core materials, or combinations thereof, as a filler, in an amount of approximately 70% by weight and a polymer of tetrafluoroethylene in an amount of approximately 30% by weight, as a binder. Therefore, the composite itself (or any component thereof) should not have a decomposition temperature which is lower than the temperature employed for effecting the sintering of the tetrafluoroethylene polymer itself.

Another method for forming the desired core, may comprise forming extruded rods of the core material by conventional extrusion molding techniques, and subsequently employing these extruded rods, properly shaped, for forming the desired gasket, covered with a sheath comprising a solid polymer of tetrafluoroethylene.

As previously indicated, the aforementioned preformed core material is next superimposed upon the surface of one of the preformed cold tetrafluoroethylene shell members. The remaining complementary shell member, similarly prepared as previously described, is then superimposed upon the aforementioned tetrafluoroethylene shell member containing the core material. The article thus obtained is now subjected to a sintering operation, preferably under the sintering temperature conditions previously described, to form a seamless, homogeneous sheath, containing the aforementioned core and comprising the improved gasket of the present invention. In general, it is preferred to carry out the sintering operation at as low a temperature as possible.

The sintering operation is preferably conducted under elevated pressure. For this purpose, pressures on the preformed tetrafluoroethylene sheath, encasing the core material, may range between about 500 and about 25,000 pounds per square inch, with pressures between about 2000 and about 15,000 pounds per square inch being preferred. The sintering cycle is completed in a period varying from about a few seconds to several minutes. After the sintering operation is complete and coherence has taken place between the tetrafluoroethylene particles to form a homogeneous sheath, the article is permitted to cool, but without reducing the pressure, in order to obtain a more uniform, homogeneous, and coherent polymeric tetrafluoroethylene sheath. After the article has cooled to room temperature (without any reduction in pressure), pressure may then be released, and the article withdrawn from the cooled die. It should also be noted that the aforementioned pressure maintained during the sintering operation, may even be increased during the subsequent cooling operation if so desired.

In the description of the operation conditions for carrying out the above-mentioned procedure in forming a relatively thin contiguous covering or sheath of the tetrafluoroethylene polymer to be encased around the core of the desired gasket, the stock to be treated is essentially a polymer of tetrafluoroethylene. It should be understood, however, that fillers and compositions other than the tetrafluoroethylene polymers of the present invention, which do not materially affect the characteristics of polytetrafluoroethylene, may also be incorporated in the sheathing material employed, and that the treatment of such compositions is also within the scope of the invention. In this respect, it has also been found desirable, in some instances, to incorporate plasticizing agents with the tetrafluoroethylene polymer to be employed, employing such plasticizers as hexadecane, benzene, cetane, toluene, ethylene glycol, ethanol, silicone oils, dibutyl phthalate, and tricresyl phosphate. In general, the thickness of the polytetrafluoroethylene sheath which is employed in conjunction with the improved gasket of the present invention, should be within the range between about .001" and about .030", with a thickness of about .015" (±.003"), being generally preferred.

Figure 2:
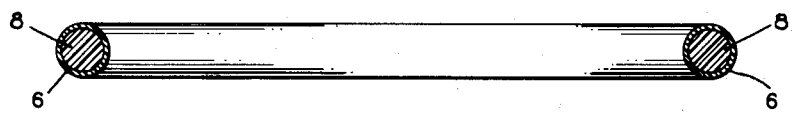
Figure 3:
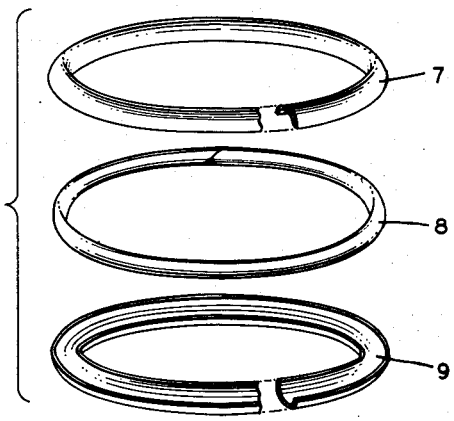

The structure of the improved insulating composition or gasket of the present invention, in the aforementioned preferred embodiment of an O ring, is shown in Figures 1, 2 and 3 of the accompanying drawing, in which Figure 1 is a plan view of the improved gasket or O ring of the present invention.

Figure 2 is a detailed cross-sectional view of the improved gasket, taken along the line 2—2 of Figure 1. In Figure 2, is shown the resilient solid core material 8 of the gasket, covered with a relatively thin contiguous and homogeneous seamless sheath or shell 6 comprising a solid polymer of tetrafluoroethylene.

Figure 3 is an exploded perspective view of the structural components of the improved gasket or O ring. In Figure 3 are shown grooved one-half O rings or shells 7 and 9, comprising cold-pressed polytetrafluoroethylene and the aforementioned core material 8, having a slightly smaller diameter than the outside periphery of the one-half O rings 7 and 9, but of such diameter as to fit snugly within the grooves of the one-half O ring shells.

Since many embodiments may be made of the present invention, and since many changes may be made in the embodiment described, it is to be understood that the foregoing description is to be interpreted as illustrative only, and not in a limiting sense.

Having thus described my invention, I claim:

1. A method for forming a gasket comprising: forming a core comprising a non-metallic resilient solid material; compressing a mass comprising a finely divided solid polymer of tetrafluoroethylene at a temperature below about 700° F. in the form of toroidal half-shells comprising an adherent unfused mass of said finely divided solid polymer; covering said core with a complementary pair of said toroidal half-shells; sintering the resulting article in a die at a temperature between about 700° F. and about 800° F. to fuse said mass of said finely divided solid polymer and bond said toroidal half-shells together into the form of a gasket having a seamless homogeneous sheath about said core; and removing the gasket thus formed from said die.

2. The gasket produced by the method of claim 1.

3. The method of claim 1 in which said non-metallic resilient solid material comprises a silicone resin.

4. The method of claim 1 in which said non-metallic resilient solid material comprises asbestos.

5. The method of claim 1 in which said non-metallic resilient solid material comprises a powdered mineral.

6. The method of claim 1 in which said non-metallic resilient solid material comprises graphite.

7. The method of claim 1 in which said non-metallic resilient solid material comprises fiber glass.

8. A method for forming a gasket comprising: forming a core comprising a non-metallic resilient solid material; compressing a mass comprising a finely divided solid polymer of tetrafluoroethylene at a temperature below about 700° F. in the form of toroidal half-shells comprising an adherent unfused mass of said finely divided solid polymer; covering said core with a complementary pair of said toroidal half-shells; sintering the resulting article in a die at a temperature between about 700° F. and about 800° F. under compacting pressure between about 500 and about 25,000 pounds per square inch to fuse said mass of said finely divided solid polymer and bond said toroidal half-shells together into the form of a gasket having a seamless homogeneous sheath about said core; and removing the gasket thus formed from said die.

9. A method for forming a gasket comprising: forming a core comprising a non-metallic resilient solid material; compressing a mass comprising a finely divided solid polymer of tetrafluoroethylene at a temperature below about 700° F. in the form of toroidal half-shells comprising an adherent unfused mass of said finely divided solid polymer; covering said core with a complementary pair of said toroidal half-shells; sintering the resulting article in a die at a temperature between about 700° F. and about 800° F. under compacting pressure between about 2000 and about 25,000 pounds per square inch to fuse said mass of said finely divided solid polymer and bond said toroidal half-shells together into the form of a gasket having a seamless homogeneous sheath about said core; and removing the gasket thus formed from said die.

10. A method for forming a gasket comprising: forming a core comprising a non-metallic resilient solid material; compressing a mass comprising a finely divided solid polymer of tetrafluoroethylene at a temperature below about 700° F. in the form of toroidal half-shells comprising an adherent unfused mass of said finely divided solid polymer; covering said core with a complementary pair of said toroidal half-shells; sintering the resulting article in a die at a temperature between about 700° F. and about 800° F. under compacting pressure between about 2000 and about 15,000 pounds per square inch to fuse said mass of said finely divided solid polymer and bond said toroidal half-shells together into the form of a gasket having a seamless homogeneous sheath about said core; and removing the gasket thus formed from said die.

11. The gasket produced by the method of claim 10.

12. A method for forming a gasket comprising: forming a core comprising a non-metallic resilient solid material; compressing a mass comprising a finely divided solid polymer of tetrafluoroethylene at a temperature below about 700° F. in the form of toroidal half-shells comprising an adherent unfused mass of said finely divided solid polymer; covering said core with a complementary pair of said toroidal half-shells; sintering the resulting article in a die at a temperature between about 700° F. and about 800° F. and under compacting pressure to fuse said mass of said finely divided solid polymer and bond said toroidal half-shells together into the form of a gasket having a seamless homogeneous sheath about said core; subsequently cooling said gasket while maintaining a pressure thereon at least as high as said compacting pressure; and removing the thus formed cooled gasket from said die.

13. The gasket produced by the method of claim 12.

14. A method for forming a gasket comprising: forming a core comprising a non-metallic resilient solid material; compressing a mass comprising a finely divided solid polymer of tetrafluoroethylene at a temperature below about 700° F. in the form of toroidal half-shells comprising an adherent unfused mass of said finely divided solid polymer; covering said core with a complementary pair of said toroidal half-shells; sintering the resulting article in a die at a temperature between about 700° F. and about 800° F. and under compacting pressure between about 500 and about 25,000 pounds per square inch to fuse said mass of said finely divided solid polymer and bond said toroidal half-shells together into the form of a gasket having a seamless homogeneous sheath about said core; subsequently cooling said gasket while maintaining a pressure thereon at least as high as said compacting pressure; and removing the thus formed cooled gasket from said die.

15. A method for forming a gasket comprising: forming a core comprising a non-metallic resilient solid material; compressing a mass comprising a finely divided solid polymer of tetrafluoroethylene at a temperature below about 700° F. in the form of toroidal half-shells comprising an adherent unfused mass of said finely divided solid polymer; covering said core with a complementary pair of said toroidal half-shells; sintering the resulting article in a die at a temperature between about 700° F. and about 800° F. and under compacting pressure between about 2,000 and about 25,000 pounds per square inch to fuse said mass of said finely divided solid polymer and bond said toroidal half-shells together into the form of a gasket having a seamless homogeneous sheath about said core; subsequently cooling said gasket while maintaining a pressure thereon at least as high as said compacting pressure; and removing the thus formed cooled gasket from said die.

16. The gasket produced by the method of claim 15.

17. A method for forming a gasket comprising: forming a core comprising a non-metallic resilient solid material; compressing a mass comprising a finely divided solid polymer of tetrafluoroethylene at a temperature below about 700° F. in the form of toroidal half-shells comprising an adherent unfused mass of said finely divided solid polymer; covering said core with a complementary pair of said toroidal half-shells; sintering the resulting article in a die at a temperature between about 700° F. and about 800° F. and under compacting pressure between about 2000 and about 15,000 pounds per square inch to fuse said mass of said finely divided solid polymer and bond said toroidal half-shells together into the form of a gasket having a seamless homogeneous sheath about said core; subsequently cooling said gasket while maintaining a pressure thereon at least as high as said compacting pressure; and removing the thus formed cooled gasket from said die.

18. A method for forming a gasket comprising: forming a core comprising a non-metallic resilient solid material as a filler and a solid polymer of tetrafluoroethylene as a binder in a weight ratio of filler to binder varying between about 1:1 and about 1:19; compressing a mass comprising a finely divided solid polymer of tetrafluoroethylene at a temperature below about 700° F. and at a pressure between about 500 and about 25,000 pounds per square inch in the form of toroidal half-shells comprising an adherent unfused mass of said finely divided solid polymer; covering said core with a complementary pair of said toroidal half-shells; sintering the resulting article in a die at a temperature between about 700° F. and about 800° F. and under compacting pressure between about 500 and about 25,000 pounds per square inch to fuse said mass of said finely divided solid polymer and bond said toroidal half-shells together into the form of a gasket having a seamless homogeneous sheath about said core; subsequently cooling said gasket while maintaining a pressure thereon at least as high as said compacting pressure; and removing the thus formed cooled gasket from said die.

19. The gasket produced by the method of claim 18.

References Cited in the file of this patent

UNITED STATES PATENTS

| | | |
|---|---|---|
| 2,358,259 | Siedschlag et al. | Sept. 12, 1944 |
| 2,360,734 | Smith | Oct. 17, 1944 |
| 2,456,262 | Fields | Dec. 14, 1948 |
| 2,459,721 | Poltorak | Jan. 18, 1949 |
| 2,538,808 | Swiss | Jan. 23, 1951 |
| 2,597,976 | Cousins | May 27, 1952 |
| 2,647,773 | Berner | Aug. 4, 1953 |

OTHER REFERENCES

Article entitled "Teflon, Components and Coating," pages 149–153, in Product Engineering Magazine for September 1952.